United States Patent
Tani

(10) Patent No.: US 6,735,156 B2
(45) Date of Patent: May 11, 2004

(54) RECORDING METHOD FOR REWRITABLE OPTICAL DISK

(75) Inventor: Hirofumi Tani, Osaka (JP)

(73) Assignee: Funai Electric Co. Ltd., Osaka (JP)

(*) Notice: Subject to any disclaimer, the term of this patent is extended or adjusted under 35 U.S.C. 154(b) by 358 days.

(21) Appl. No.: 10/015,649

(22) Filed: Dec. 17, 2001

(65) Prior Publication Data

US 2002/0075781 A1 Jun. 20, 2002

(30) Foreign Application Priority Data

Dec. 18, 2000 (JP) .................................. P 2000-383835

(51) Int. Cl.[7] .................................................. G11B 7/00
(52) U.S. Cl. .............................. 369/53.15; 369/47.11; 369/59.14; 369/53.24
(58) Field of Search .......................... 369/53.12, 53.24, 369/53.13, 53.15, 47.11, 59.14

(56) References Cited

U.S. PATENT DOCUMENTS

| | | | | | |
|---|---|---|---|---|---|
| 4,149,142 A | * | 4/1979 | Kageyama et al. | ......... | 714/748 |
| 4,916,701 A | * | 4/1990 | Eggenberger et al. | ...... | 714/758 |
| 5,388,013 A | * | 2/1995 | Nakamura | .................... | 360/48 |
| 5,559,778 A | * | 9/1996 | Inokuchi et al. | ......... | 369/53.24 |
| 5,721,856 A | * | 2/1998 | Takeuchi | ....................... | 711/1 |
| 6,091,686 A | * | 7/2000 | Caffarelli et al. | ........ | 369/53.24 |
| 6,115,537 A | * | 9/2000 | Yamada et al. | ............. | 386/109 |
| 6,591,363 B1 | * | 7/2003 | von Below | ..................... | 713/2 |
| 6,594,214 B1 | * | 7/2003 | Misaizu | .................... | 369/53.11 |

FOREIGN PATENT DOCUMENTS

JP        10-143980        5/1998

\* cited by examiner

*Primary Examiner*—Gautam R. Patel
(74) *Attorney, Agent, or Firm*—Morgan, Lewis & Bockius LLP

(57) ABSTRACT

When an error has occurred during the recording of an optical disk, the track recording system is changed from a variable-length packet write system to a fixed-length packet write system employing an arbitrary length (step S2). A check is performed to determine whether before the error occurred the number of blocks used for recording was equal to or greater than 300, which is the minimum block length for one track (step S4). When at least 300 blocks have not been used for recording, by using as a recording unit a fixed-length packet having the arbitrary length, the dummy data are continuously recorded until the used block count reaches 300 (steps S5 to S7). Thus, when an error occurs during the recording of dummy data (Yes at step S6), one fixed-length packet is added (step S8) and the recording of dummy data is continued.

4 Claims, 2 Drawing Sheets

RECORDING METHOD FOR REWRITABLE OPTICAL DISK

BACKGROUND OF THE INVENTION

1. Technical Field

The present invention relates to a rewritable optical disk recording method for a variable-length packet writing system that sequentially receives, from a host computer, data that is accumulated in a buffer memory, and that sequentially reads and then writes the accumulated data via an optical pickup that follows up at a predetermined speed.

2. Prior Art

For the recording of data on a rewritable optical disk, generally, a fast interface, a bus, is used to transmit target data from a host computer to a recording apparatus. Thereafter, the recording apparatus temporarily stores the recording data in a buffer memory from which, in accordance with a fixed-length packet writing system, the data is sequentially read before being written on an optical disk using an optical pickup.

When due to scratches or dust on an optical disk, variable-length packet write system recording errors occur while data are being recorded, the information actually recorded in a PMA does not match the contents of the recording data that are provided for a track. Thus, at this point, media errors occur, i.e., deterioration in the use of the optical disk occurs.

To resolve this problem, an example information recording/reproduction apparatus has been proposed (refer to the Unexamined Japanese Patent Application Publication No. Hei10-143980).

When the recording of an optical disk is halted due to the occurrence of a servo error, such as an off-track, an information recording/reproduction apparatus stores the current error address, and begins to record predetermined dummy data near that address in the remaining portion of the area that has been allocated as a track. For an explanation of this process, a detailed flowchart in FIG. 5 of the reference publication should specifically be referred to.

That is, when an error occurs during recording, the information recording/reproduction apparatus records up to 300 blocks, the minimum length of one track, of dummy data, records the error information in the PMA, and halts the processing.

[Problems to be Solved]

It is highly probable that errors due to scratches or dust on the surface of an optical disk will occur not merely on one occasion but repetitively. In other words, it is highly probable that when an error has occurred during recording, an error will again occur during a current additional writing process for recording dummy data.

However, when an error occurs during the additive writing process for dummy data, the conventional information recording/reproduction apparatus simply performs an error process and halts the processing (step S27 in FIG. 5), and no consideration is given for an error that occurs during the additional writing process. In other words, the conventional information recording/reproduction apparatus can not cope with an error that occurs during the additive writing of dummy data.

Assume that when an error occurs during the additive writing process the additive writing process is repeated from the beginning. Then, if ten errors occur repetitively, ten tracks will be employed for the additive writing of dummy data, and the number of available tracks will be reduced considerably. Further, if an error occurs after the additive writing of 100 blocks has been completed, the additive writing process will be continued for the remaining 200 blocks to complete the recording for one track, and thereafter, the additive writing process will again be performed for another track (300 blocks). As a result, blocks that originally were available will also be used for the additive writing process, and the data recordable area will be reduced by an amount equivalent to the size of these blocks.

SUMMARY OF THE INVENTION

To resolve the conventional shortcomings, it is one objective of the present invention to provide a recording method for a rewritable optical disk whereby, even when an error has occurred during an error process (in the prior art, an additive writing process), the additive writing of data to an optical disk is enabled without the number of tracks used for the error process being increased, and without the number of available blocks being reduced more than is necessary.

[Means for Solving the Problems]

To achieve this objective, according to a first aspect of the invention, provided is a recording method for a rewritable optical disk having a variable-length packet write system that sequentially accumulates, in a buffer memory, data received from a host computer, and that sequentially reads the data and writes the data on the rewritable optical disk via an optical pickup, which follows up at a predetermined speed, the recording method comprising:

a first step of, when an error occurs during the recording of the rewritable optical disk, determining whether a track currently being used for recording is a reserve track;

a second step of, when the track currently being used is a reserve track, changing the recording system for the track that is currently being used from a variable-length packet write system to a fixed-length packet write system employing an arbitrary length;

a third step of, when the track currently being used is not a reserve track, determining whether an area equal to or greater than 300 blocks, which is the minimum length of one track, has been employed for recording before the occurrence of the error;

a fourth step of, when at least 300 blocks have not yet been employed, continuing to record dummy data using the fixed-length packet write system until at least 300 blocks, including packets currently being used, have been recorded;

a fifth step of, when an error has occurred during the recording of the dummy data at the fourth step, continuously recording dummy data so as to add one fixed-length packet having the arbitrary length; and a sixth step of recording link blocks when at the third step it is ascertained that at least 300 blocks have been employed for recording, when according to the fourth step up to at least 300 blocks of the dummy data have been recorded using the fixed-length packet write system, or when according to the fifth step the dummy data has been recorded up to the added packet. Null or silent data is recorded as the dummy data.

According to the invention including this feature, when an error occurs during the recording of an optical disk, the track recording system is changed from the current variable-length packet write system to a fixed-length packet write system employing an arbitrary length. Then, the dummy data is continuously recorded using a fixed-length packet having the arbitrary length until at least a total of 300 blocks have been recorded along the track, including the recorded packet. Finally, the link blocks (a RUN-OUT1 block, a RUN-OUT2 block and a LINK block) are recorded. At this time, dummy data is continuously recorded, so that each time an error occurs during the recording of dummy data, one arbitrary length, fixed-length packet is added. By repeating this process, the dummy data are recorded using the fixed-length packet write system until a count of at least 300 blocks has been reached along the track, and then, finally, the link blocks (a RUN-OUT1 block, aRUN-OUT2 block and a LINK block) are recorded.

Specifically, when an error attributable to a variable-length packet write system occurs during the recording of an optical disk, the track recording method is changed from the current variable-length packet write system to a fixed-length packet write system employing an arbitrary length, and an error process is performed. When an error again occurs during the error process, one fixed-length packet having the designated arbitrary length is added to continue the recording of dummy data. And finally, when at least 300 blocks of dummy data have been recorded, the link blocks are recorded.

That is, the recorded data is correctly read only up to the packet immediately preceding the occurrence of the error. However, since the data is recorded in the same form as that used for the normal track for the link blocks, a new track can be added, and used, after it is determined along which track the dummy data has been recorded. Furthermore, even when an error again occurs during the error process, the dummy data is continuously recorded while one fixed-length packet is added, and finally, the link blocks are recorded. Therefore, while the number of blocks wherein the dummy data are recorded may exceed 300, only one track is required for the error process. In other words, since only one track is required for the error process, a savings can be realized during the recording of the data for the track. In addition, since dummy data is continuously recorded, even when an error again occurs during the error process, compared with the conventional information recording/reproduction apparatus, no more available blocks, i.e., free area, will be employed than is necessary. That is, according to the present invention, even when another error occurs during an error process, for the recording of dummy data, only the addition of the minimum number of blocks having an arbitrary fixed-length packet length is required.

According to a second aspect of the invention, a recording method is provided for a rewritable optical disk using a variable-length packet write system that sequentially accumulates, in a buffer memory, data received from a host computer, and that sequentially reads and writes the data on the rewritable optical disk via an optical pickup that follows up at a predetermined speed, the recording method comprising:

a first step of changing the recording system for a track that is currently being used from a variable-length packet write system to a fixed-length packet write system having an arbitrary length;

a second step of determining whether blocks equal to or greater than a predetermined number have been employed for recording before the error occurred;

a third step of, when a number of blocks equal to or greater than the predetermined number has not been employed, continuously recording dummy data in accordance with the fixed-length packet write system until the total number of blocks, including packets that are currently employed, reaches the predetermined number of blocks;

a fourth step of, when an error occurs during the recording of the dummy data, continuously recording dummy data by adding a fixed-length packet having the arbitrary length; and a fifth aspect of finally recording link blocks when at the second step it has been ascertained that the predetermined number of blocks has been employed for recording, when at the third step it has been determined that the dummy data has been recorded using the fixed-length packet system until the predetermined number of blocks has been reached, or when at the fourth step the dummy data has been recorded up to the packet that is added.

According to this invention that includes this feature, while the recorded data can be correctly read only up to the packet immediately preceding the occurrence of an error, data is recorded in the same form as a normal track along which the link blocks are recorded. Thus, following the track along which the dummy data has been recorded, data can be recorded along a new track that is added. In addition, since the dummy data is continuously recorded, even when an error has again occurred during the error process, until finally the link blocks are recorded, only one track is required for the error process. In other words, since only one track is employed for the error process, the tracks used for recording data are not wasted. Furthermore, since the dummy data is continuously recorded, even when an error has again occurred during the error process, compared with the conventional information recording/reproduction apparatus, no more of the available blocks will be consumed than is necessary.

DETAILED DESCRIPTION OF THE PREFERRED EMBODIMENTS

[Mode for Carrying Out the Invention]

The preferred embodiment of the present invention will now be described while referring to the accompanying drawings.

Figure 1:
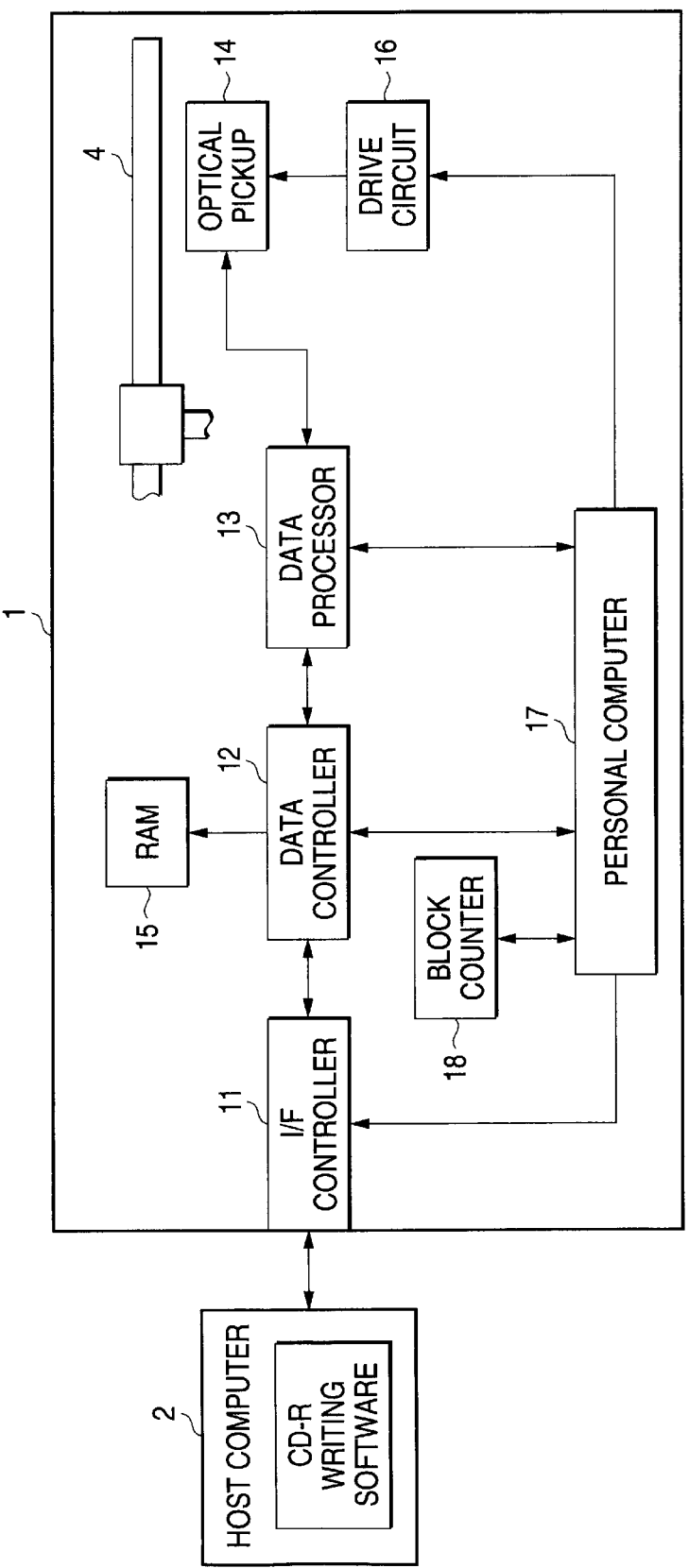
FIG. 1 is a diagram showing the general system configuration, according to the invention, for which a recording method for a rewritable optical disk is applied.

FIG. 1 is a diagram showing the general system configuration for a recording method for a rewritable optical disk.

This system comprises: a CD-R (/RW) drive 1, which is a drive for a rewritable optical disk; and a host computer 2, which employs the CD-R (/RW) drive 1 to record data.

The CD-R (/RW) drive 1 includes an interface controller (I/F controller) 11, for establishing a connection with the host computer 2, and a data controller 12 and a personal computer 17, which are connected to the I/F controller 11. An optical pickup 14 is connected to the data controller 12, via a data processor 13, and a RAM 15, which is a buffer memory, is also connected thereto.

The optical pickup 14 is driven by a drive circuit 16 under the control of the personal computer 17. In other words, during data recording, the optical pickup 14 is moved out at a predetermined velocity (follows up) across the recording face of an optical disk 4 in the radial direction.

The personal computer 17 controls the I/F controller 11, the data controller 12 and the-data processor 13.

Specifically, upon receiving an instruction from the personal computer 17, the I/F controller 11 outputs a data transfer request (transfer command) to the host computer 2.

Then, in accordance with the transfer command, the host computer 2 sequentially transfers the recorded data to the CD-R (/RW) drivel. The recorded data are transmitted to the data controller 12 via the I/F controller 11, and are stored in the RAM 15 in accordance with an instruction received from the data controller 12.

The data processor 13 performs signal processing (encoding) for recording data on the optical disk 4. That is, to record data on the optical disk 4, the data processor 13 prepares signal encoding in accordance with the instruction received from the personal computer 17, and outputs a ready command to the personal computer 17 when the signal encoding is ready. Then, the data encoded by the data processor 1 is sequentially recorded on the optical disk 4 by the optical pickup 14. In this embodiment, a variable-length packet write system is employed to record the data on the optical disk 4.

When a servo error occurs due to a scratch or dust on the optical disk 4 while the data is being recorded using the variable-length packet write system, and as a result a recording error occurs, the personal computer 17 begins the recording error process that is the feature of the invention. At this time, the personal computer 17 permits the data processor 13 to record dummy data along the track whereat the error has occurred. To count the number of blocks wherein the dummy data are recorded, a block counter 18 is connected to the personal computer 17.

Figure 2:
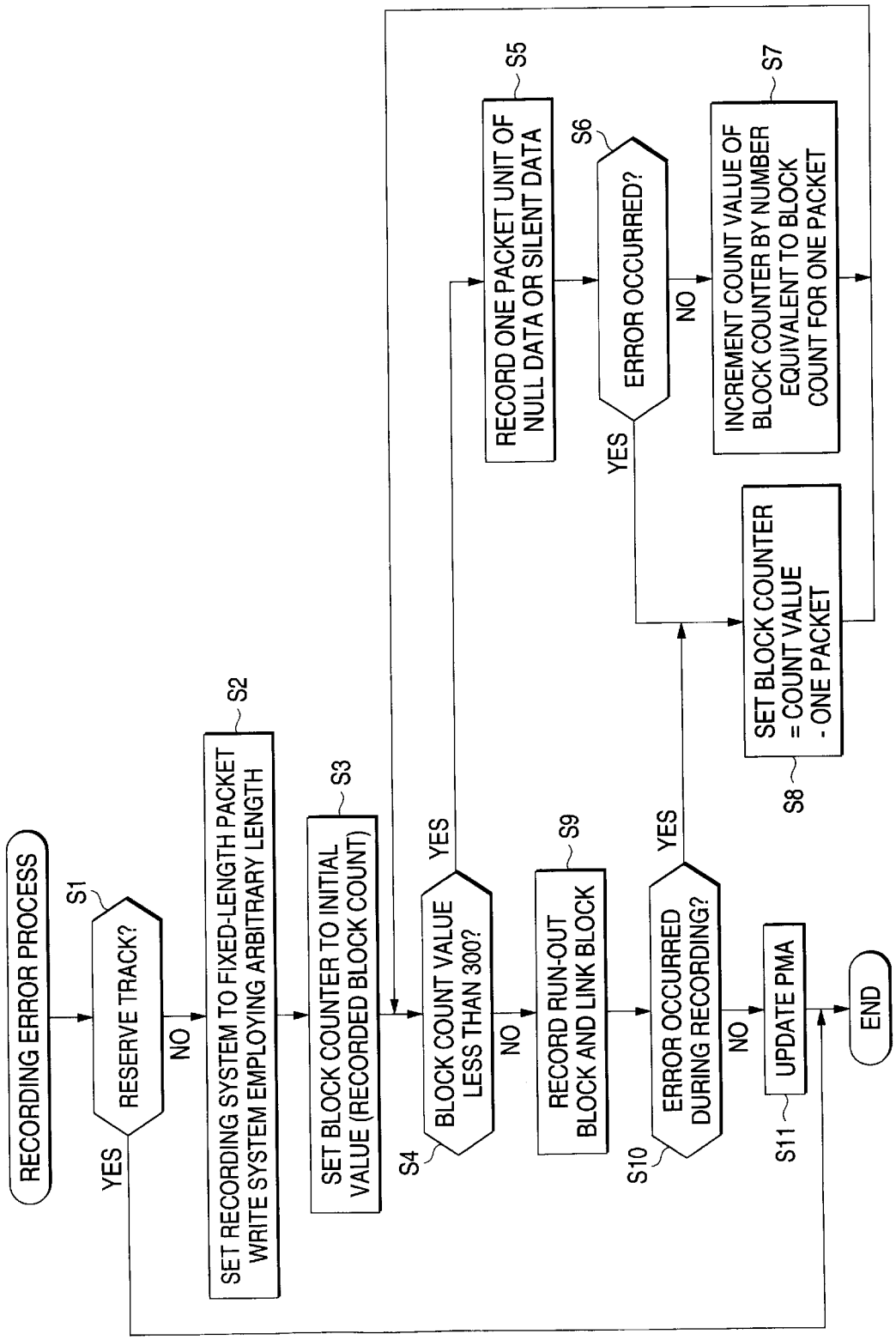
FIG. 2 is a flowchart for explaining the recording method of the invention used for a rewritable optical disk.

The recording error processing will now be described while referring to the flowchart in FIG. 2.

When a recording error due to a servo error occurs while data is currently being recorded on the optical disk 4 using the variable-length packet write system, the personal computer 17 determines whether the track that is currently being employed is a reserve track (step S1). A reserve track is one along which data is recorded after the information has been recorded in the PMA, while an invisible track is one along which data is recorded first and only after that is the data recorded in the PMA. That is, when the currently employed track is a reserve track (when the decision at step S1 is Yes), the information for the PMA is also present along this track, so that the recording error processing is not performed and is terminated.

When the currently employed track is not a reserve track, i.e, when the track is an invisible track (the decision at step S1 is No), the recording error processing of the invention is performed. That is, at step S2 the personal computer 17 changes the recording system for the track that is currently being used from a variable-length packet write system to a fixed-length packet write system employing an arbitrary length. In other words, the following recording is performed using the fixed-length packet write system employing the arbitrary length.

The fixed-length packet is composed of at least eight blocks; at least one user data block, four link blocks (RUN-IN1 to RUN-IN4 blocks), and three link blocks (a RUN-OUT1 block, a RUN-OUT2 block and a LINK block). Therefore, while there are 16 user data blocks, the fixed-length packet includes 23 blocks. In this embodiment, the number of blocks constituting the fixed-length packet is set in advance (e.g., 23 blocks) At step S3, the personal computer 17 sets the block counter 18 to the initial value. This initial value is the number of blocks used for recording before the occurrence of an error.

At step S4, the personal computer 17 compares the count value held by the block counter 18 with the minimum length (300 blocks) for one track, which is internally set in advance, to determine whether the number of blocks that had been used for recording before the error occurred was equal to or greater than 300, which is the minimum length for one track.

When at least 300 blocks are indicated by the count value (the decision at step S3 is No), the personal computer 17 records the link blocks (the RUN-OUT1 block, the RUN-OUT2 block and the LINK block) (step S9). Thus, when the error occurred during data recording, program control advances to step S8, which will be described later. However, when the recording of the link blocks has been completed normally (the decision at step S10 is Yes), the information along the track is recorded in the PMA (step S11), and the error processing is terminated.

When it is ascertained at step S4 that the block count value does not indicate a number equal to or greater than 300 the decision at S4 is Yes), program control advances to step S5 and null data or silent data, which are dummy data, are recorded at intervals equivalent to one fixed-length packet having an arbitrary length (23 blocks in this case) that was set at step S2.

When the dummy data has been recorded at intervals equivalent to one fixed-length packet (e.g., 23 blocks), a check is performed to determine whether an error has occurred during the recording (step S6). When an error has not occurred, at step S7 the count value held by the block counter 18 is incremented by a number equivalent to one packet (23 blocks in this embodiment). Program control then returns to step S4, and the obtained count value is compared with the block count of 300 that was internally set in advance.

So long as an error does not occur again during the error process for which the dummy data-are recorded (so long as the decision at step S6 is not Yes), the processes at steps S4 to S7 are repeated, and the dummy data is recorded using the fixed-length packet write system until the total number of blocks used exceeds 300, which is the minimum length for one track. When the number of blocks of regular data and dummy data that have been recorded is equal to or greater than 300, i.e., when the count value held by the block counter 18 exceeds 300, the decision at step S4 is No, and the personal computer 17 records the link blocks following the current track (step S9). When an error has also occurred during the recording (the decision at step S10 is Yes), program control again advances to step S8. Thereafter, when the recording of the link blocks has been completed normally (the decision at step S10 is Yes), the information along the track is recorded in the PMA (step S11) and the error processing is terminated.

When an error has again occurred during the error process for which the dummy data are recorded (the decision at step S6 is Yes in the repetitive process at steps S4 to S7), the personal computer 17 decrements the count value held by the block counter 18 by a number equivalent to one fixed-length packet (23 blocks in this case), i.e., the number of blocks equivalent to one fixed-length packet is added and is to be used for the recording of dummy data. Program control thereafter returns to step S3.

That is, even when the condition is repeated wherein an error again occurs during the error process (this condition tends to occur when a disk is scratched), only the number of blocks equivalent to one packet need be added for the error process. Thus, the number of blocks used for the error process, i.e., the number of blocks used to record dummy data, can be minimized, and as large an area as possible can be obtained for use for the following data recording.

When the process for decrementing the count value held by the block counter 18, i.e., substantially, a process for adding the number of blocks, equivalent to one packet, that are to be used for recording dummy data, is repeated each time an error has occurred during the error process, and when the blocks of dummy data that have been recorded is equivalent in number to the count of the blocks in one added packet (the decision at step S6 is No), at step S7 the count value held by the block counter 18 is incremented, and program control returns to step S4.

When it is ascertained at step S4 that the count value held by the block counter 18 exceeds 300, the personal computer 17 records the link blocks at the end of the track (step S8). And thereafter, when the recording of the link blocks has been completed normally (the decision at step S10 is Yes), the information on the track is recorded in the PMA (step 11) and the error processing is terminated.

Specifically, according to the recording method of the present invention for a rewritable optical disk, when an error occurs while data is being recorded using by the variable-length packet write system, the track recording system is changed from the variable-length packet write system to a fixed-length packet write system employing an arbitrary length, and the recording error process is performed. Then, when a further error occurs while the dummy data is being recorded during the recording error process, one arbitrary length, fixed-length packet is added for the continuing recording of the dummy data. Subsequently, when a block count of 300, the minimum length for one track, has been obtained, the link blocks indicating the end of a track are recorded. As a result, while 300 blocks, the minimum length for one track, are obtained, the number of blocks that must be added to record dummy data can be minimized by employing as a recording unit the fixed-length packet having an arbitrary length. Further, the number of blocks used for the error process, i.e., the number of blocks used to record dummy data, can be minimized, so that as large an area as possible can be obtained for the succeeding data recording.

[Advantages of the Invention]

According to the recording method of the invention for a rewritable optical disk, when an error occurs during the recording of data using a variable-length packet write system, the track recording system is changed from the variable-length packet write system to a fixed-length packet write system employing an arbitrary length, and the recording error process is performed. Then, when an error again occurs during the recording error process, one fixed-length packet having the arbitrary length that was set is added, and the recording of dummy data is continued. When the blocks of dummy data that have been recorded is at least 300, the link blocks are recorded at the end. Thus, while the recorded data can be correctly read only up to the packet immediately preceding the occurrence of the error, the data is recorded using the same form as a normal track for which the link blocks are recorded, so that, following the track along which the dummy data are recorded, a new track can be added and used for recording.

Further, when an error has again occurred during the error process, the dummy data can be continuously recorded by the addition of one fixed-length packet having an arbitrary length, at the end of which the link blocks can be recorded. Thus, even when the total number of blocks used to record dummy data exceeds 300, only one track is required for the error process. In other words, since only one track is required for the error process, the tracks available for the recording of data are not wastefully employed.

In addition, since the dummy data is continuously recorded even when a further error occurs during the error process, compared with the conventional information recording/reproduction apparatus, no more of the available blocks (i.e., free area) will be consumed than is necessary. That is, according to the invention, when an error has again occurred during the error process, 300 blocks, which is the minimum length for one track, can be obtained, while the number of blocks that must be added to record dummy data can be minimized by employing as a recording unit a fixed-length packet having an arbitrary length. As a result, a large area can be obtained for the succeeding data recording.

What is claimed is:

1. A recording method for a rewritable optical disk having a variable-length packet write system that sequentially accumulates, in a buffer memory, data received from a host computer, and that sequentially reads said data and writes the data on said rewritable optical disk via an optical pickup, which follows up at a predetermined speed, said recording method comprising:

a first step of, when an error occurs during the recording of said rewritable optical disk, determining whether a track currently being used for recording is a reserve track;

a second step of, when the track currently being used is a reserve track, changing said recording system for the track that is currently being used from a variable-length packet write system to a fixed-length packet write system employing an arbitrary length;

a third step of, when the track currently being used is not a reserve track, determining whether an area equal to or greater than 300 blocks, which is the minimum length of one track, is employed for recording before the occurrence of the error;

a fourth step of, when at least 300 blocks are not employed, continuing to record dummy data using said fixed-length packet write system until at least 300 blocks, including packets currently being used, are recorded;

a fifth step of, when an error has occurred during the recording of the dummy data at said fourth step, continuously recording dummy data so as to add one fixed-length packet having the arbitrary length; and a sixth step of recording link blocks when at the third step it is ascertained that at least 300 blocks are employed for recording, when according to the fourth step up to at least 300 blocks of the dummy data are recorded using said fixed-length packet write system, or when according to the fifth step the dummy data is recorded up to the added packet.

2. The recording method according to claim 1, wherein null or silent data is recorded as the dummy data.

3. A recording method for a rewritable optical disk using a variable-length packet write system that sequentially accumulates, in a buffer memory, data received from a host computer, and that sequentially reads and writes said data on said rewritable optical disk via an optical pickup that follows up at a predetermined speed, said recording method comprising:

a first step of changing said recording system for a track that is currently being used from a variable-length packet write system to a fixed-length packet write system having an arbitrary length;

a second step of determining whether blocks equal to or greater than a predetermined number are employed for recording before the error occurred;

a third step of, when a number of blocks equal to or greater than the predetermined number is not employed, continuously recording dummy data in accordance with said fixed-length packet write system until the total number of blocks, including packets that are currently employed, reaches the predetermined number of blocks;

a fourth step of, when an error occurs during the recording of the dummy data, continuously recording dummy data by adding a fixed-length packet having the arbitrary length; and a fifth aspect of finally recording link blocks when at the second step it is ascertained that the predetermined number of blocks is employed for recording, when at the third step it is determined that the dummy data is recorded using said fixed-length packet system until the predetermined number of blocks is reached, or when at the fourth step the dummy data is recorded up to the packet that is added.

4. The recording method according to claim 3, wherein null or silent data is recorded as the dummy data.

* * * * *